(No Model.)

A. E. APPLEYARD.
SWITCH ATTACHMENT FOR STREET RAILWAY CARS.

No. 426,980. Patented Apr. 29, 1890.

WITNESSES.
Frank G. Parker
Matthew M. Blunt

INVENTOR.
Arthur E. Appleyard

UNITED STATES PATENT OFFICE.

ARTHUR E. APPLEYARD, OF BOSTON, MASSACHUSETTS.

SWITCH ATTACHMENT FOR STREET-RAILWAY CARS.

SPECIFICATION forming part of Letters Patent No. 426,980, dated April 29, 1890.

Application filed September 2, 1889. Serial No. 322,756. (No model.)

*To all whom it may concern:*

Be it known that I, ARTHUR EDWARD APPLEYARD, of Boston, in the county of Suffolk and State of Massachusetts, have invented certain new and useful Improvements in Switch Attachments for Street-Railway Cars, of which the following, taken in connection with the accompanying drawings, is a specification.

The object of my invention is to so construct and arrange an auxiliary wheel (attached to the under side of a street-car) that it may be made to move by a lever in the hands of the car attendant, so as to engage with a central switch-piece or an auxiliary rail and cause the car to be switched from the main track either to the right or left. This object I attain by the mechanism shown in the accompanying drawings, in which—

Figure 1:
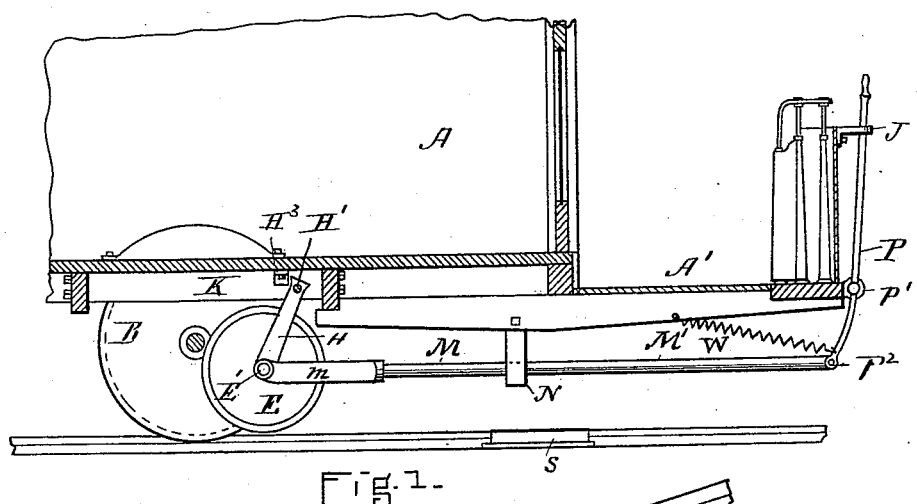
Figure 2:
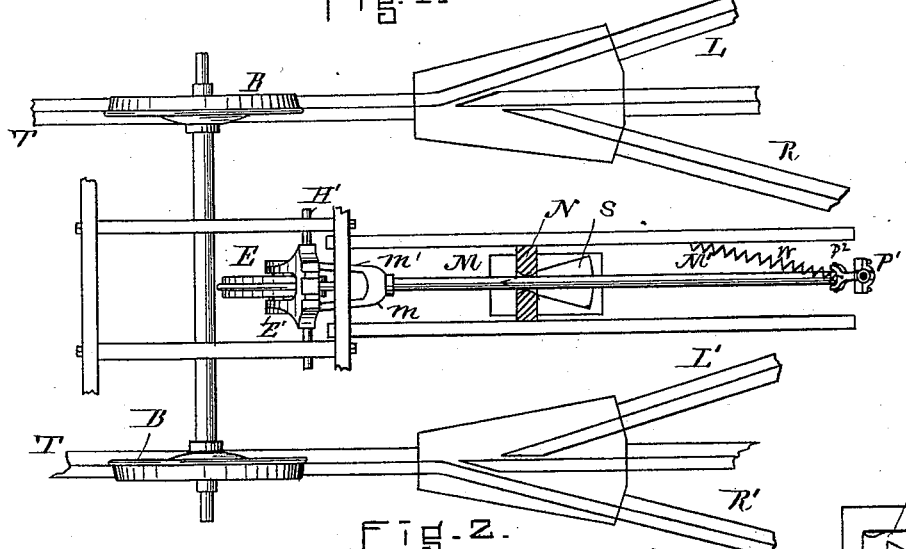
Figures 3, 4, 5:
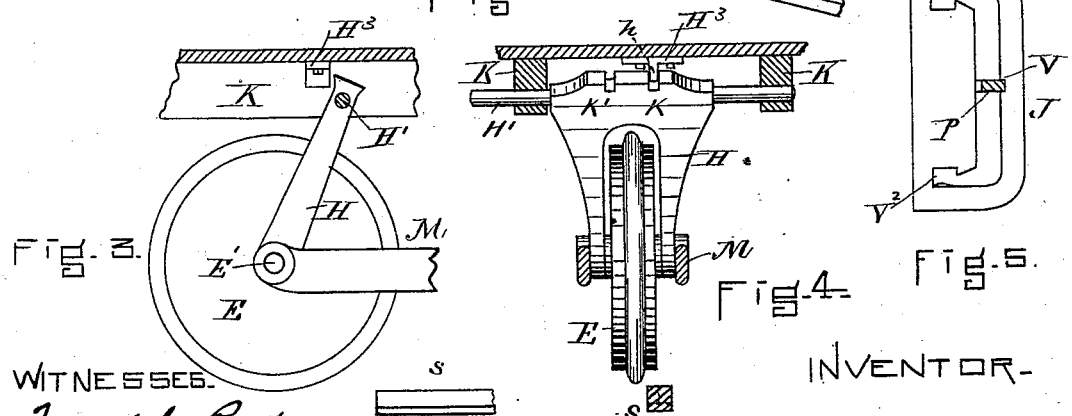

Figure 1 is a view, partly in elevation and partly in longitudinal section, showing parts of a street-car having my device attached. Fig. 2 is a plan view showing tracks, one set of car-wheels, and parts of my device. Fig. 3 is a side elevation showing my auxiliary wheel and some of its connected parts. Fig. 4 is a front elevation of the parts shown in Fig. 3. Fig. 5 is a plan of a part of the catch device for holding the operating-lever, and through it the auxiliary wheel, in position.

In the drawings, A represents a portion of a street-car, and A' an end platform, (in this case the front platform.)

B, Figs. 1 and 2, represents the ordinary wheels, and T, Fig. 2, the main-line track, from which L L' represent a left-hand side track or turn-out, and R R' represent a right-hand side track or turn-out, of any ordinary construction.

In my construction I use a fixed switch piece or rail S, Figs. 2, 3, and 4, situated centrally between the rails, with its point toward a car on the main line approaching the branches or turn-outs.

E represents an auxiliary wheel located centrally under the car and just in front of the axle. In practice two wheels like E are used, one in front of each axle—that is, between the axle and the platform of the car. The auxiliary wheel E has a journal at E', which rotates in a swinging housing H. This housing H is made very strong, and is pivoted by a rod H' to a suitable frame-work K K under the floor of the car. The rod H' (see Fig. 4) can slide in the frame-work K K, thus admitting the movement of the wheel E laterally a distance sufficient to take the wheel E to either side of the point of the fixed switch-piece S—that is, if it is desirable to have the car run onto the left-hand track, the wheel E is moved to the left, so that it comes in contact with the left-hand side of the switch-piece S, and thus lead the wheels B onto the left-hand track. To go to the right the wheel E is so planned that it will take the right side of the fixed switch-piece S.

For convenience in moving the auxiliary wheel E and fastening it in position I have the following device: M M' is a bar of iron, forked at $m\ m'$, Fig. 2, and attached to the housing H, as indicated in Figs. 2, 3, and 4. This bar M M' passes through an opening in a bracket-piece N, firmly attached to the frame-work of the car, (see Figs. 1 and 2,) so that the bar M M' is free to be drawn lengthwise or to swing from right to left. To the end M' of the bar M M', I attach by means of a pivot $P^2$ a hand-lever P, which is hung by a universal joint at P', so that it may be moved back and forth or right and left, as may be desired.

J, Figs. 1 and 5, is a catch-plate having a central notch at V, Fig. 5, and side notches V' and $V^2$.

The upper end H' of the housing H has two notches K K', (see Fig. 4,) which are adapted to engage with a projection $h$, formed on the bracket $H^3$, which is securely attached to the under side of the car.

W, Fig. 1, is a strong tension-spring, which serves to pull the bar M M' backward, and thus swing the housing H backward and wheel E upward, so as to free the wheel from the switch S.

The operation of my device is as follows: The wheel E is held in its normal position by the spring W—that is, the hand-lever P is allowed to swing outward into the notch V and there held from any lateral motion, and as long as the lever P is in this position the bar M M' is held centrally under the car. This forces the housing H and the wheel E to remain in a central position, the wheel E being swung up, as shown in Fig. 1, so as to be free to pass over the switch-piece S without touching it. When the attendant wishes to go to the right, he pulls the hand-lever P out of the notch V and moves it to the right. This action will throw the end M' of the bar M M' to the left and the other end of said lever to the right, taking with it the housing H and wheel E. Now by drawing the lever toward him and into the notch V' he will force the housing H to swing forward, thus taking the wheel E down, so as to engage with the right side of the fixed switch-piece S and draw the car to the right, as desired.

It will be readily understood that a movement of the hand-lever P to the left will send the car to the left in the same manner that the movement of the lever to the right will send the car to the right, as explained above.

The projection $h$, Fig. 4, serves as a holder to keep the housing H and the wheel E in place laterally by entering one of the notches K K', as the car may be when the housing is swung down—that is, when the wheel E is in position to act.

I claim—

In a switch attachment for street-railway cars, the combination of the wheel E, laterally-moving housing H, lever-bar M M', and hand-lever P, with the fixed switch-piece S, substantially as and for the purpose set forth.

In testimony whereof I have signed my name to this specification, in the presence of two subscribing witnesses, on this 30th day of August, A. D. 1889.

ARTHUR E. APPLEYARD.

Witnesses:
FRANK G. PARKER,
MATTHEW M. BLUNT.